(12) United States Patent
Dotz

(10) Patent No.: US 11,770,040 B2
(45) Date of Patent: Sep. 26, 2023

(54) STATOR WITH PINS FOR AN ELECTRIC MACHINE

(71) Applicant: VALEO SIEMENS EAUTOMOTIVE GERMANY GMBH, Erlangen (DE)

(72) Inventor: Boris Dotz, Munich (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 350 days.

(21) Appl. No.: 17/120,642

(22) Filed: Dec. 14, 2020

(65) Prior Publication Data
US 2021/0184527 A1     Jun. 17, 2021

(30) Foreign Application Priority Data

Dec. 17, 2019   (DE) ................ 10 2019 134 793.9

(51) Int. Cl.
*H02K 3/28*     (2006.01)
*B60K 1/00*     (2006.01)

(52) U.S. Cl.
CPC ............. *H02K 3/28* (2013.01); *B60K 1/00* (2013.01)

(58) Field of Classification Search
CPC .. H02K 3/28; H02K 3/12; H02K 3/04; H02K 3/18; H02K 3/14; H02K 3/50; H02K 3/505; H02K 3/46; H02K 3/34; H02K 3/522; H02K 3/345; H02K 1/165; H02K 1/16; H02K 1/12; H02K 1/265; H02K 1/27; H02K 1/20; H02K 1/146; H02K 1/148; H02K 1/14; H02K 15/0478; H02K 15/085; H02K 15/064; H02K 15/026; H02K 15/066; H02K 15/0031; H02K 15/02; H02K 15/0428; H02K 15/068
See application file for complete search history.

(56) References Cited

U.S. PATENT DOCUMENTS

| | | | |
|---|---|---|---|
| 7,034,428 B2 | 4/2006 | Cai et al. | |
| 9,130,416 B2 | 9/2015 | Baba et al. | |
| 9,136,738 B2 | 9/2015 | Ikeda et al. | |
| 10,461,591 B2 | 10/2019 | Sakaue et al. | |
| 11,489,388 B2 * | 11/2022 | Dotz | ............ H02K 3/28 |
| 2006/0033394 A1 * | 2/2006 | Ogawa | ............ H02K 3/12 |
| | | | 310/179 |

FOREIGN PATENT DOCUMENTS

| | | |
|---|---|---|
| DE | 10321956 A1 | 3/2004 |
| DE | 102012201698 A1 | 8/2012 |
| DE | 112013003398 T5 | 4/2015 |

* cited by examiner

*Primary Examiner* — Bryan R Perez
(74) *Attorney, Agent, or Firm* — Manabu Kanesaka

(57) ABSTRACT

A stator for an electric machine includes a plurality of pins arranged on concentric circles at different distances to a stator center in slots, each concentric circle forming a layer, wherein six pins in different layers are serially connected to one another and form a winding. A first pin is located in a first slot in the 6n-1 layer, wherein n is an integer. A second pin is located in a second slot in the 6n layer, wherein the second slot has a first radial distance to the first slot in a first circumferential direction of the stator. A third pin is located in a third slot in the 6n-2 layer. A fourth pin is located in a fourth slot in the 6n-3 layer. A fifth pin is located in the first slot in the 6n-5 layer. A sixth pin is located in the second slot in the 6n-4 layer.

11 Claims, 17 Drawing Sheets

STATOR WITH PINS FOR AN ELECTRIC MACHINE

RELATED APPLICATIONS

The present application is based on, and claims priority from, German Application No. DE 10 2019 134 793.9 filed Dec. 17, 2019, the disclosure of which is hereby incorporated by reference herein in its entirety.

The invention relates to a stator with pins for an electric machine, in particular an electric motor.

BACKGROUND INFORMATION

Electric machines are generally known and are increasingly used as electric motors for driving vehicles. An electric machine consists of a stator and a rotor.

The stator comprises a plurality of slots, in which the windings are guided. The windings may be formed from insulated copper rods, as so-called pins. The rotor is located in the stator and is connected to a rotor shaft.

Such a pin, U pin, or hairpin motor is known, for example, from U.S. Pat. No. 9,136,738 B2.

BRIEF DESCRIPTION OF THE INVENTION

The object of the present invention is to provide a stator with windings made from pins, which is easy to manufacture.

According to the invention a stator for an electric machine comprises a plurality of pins, which are arranged on concentric circles at different distances to a stator center in slots in the stator, and each concentric circle forms a layer, wherein in each case six pins in different layers are serially connected to one another and form a winding, a first pin of the winding is located in a first slot in the 6n-1 layer, wherein n is an integer, a second pin of the winding is located in a second slot in the 6n layer, wherein the second slot has a first radial distance to the first slot in a first circumferential direction of the stator, a third pin of the winding is located in a third slot in the 6n-2 layer, a fourth pin of the winding is located in a fourth slot in the 6n-3 layer, a fifth pin is located in the first slot in the 6n-5 layer, a sixth pin of the winding is located in the second slot in the 6n-4 layer.

A winding may thereby circulate repeatedly about the teeth.

The layers may be numbered in ascending order from the outside inward to the stator center. The number zero does not belong to the mentioned integers.

A stator with the winding according to the invention may be easily produced and generates an efficient electromagnetic field. The connection types establish an electrically conductive connection between the pins in the slots. The connection type may be a welding of conductors to the pins, or the pins may already be designed as double pins, so-called U pins, and thus already establish a connection upon insertion into the stator. Furthermore, a bonding of end sections of the pins bent toward one another also represents a connection type.

The third slot may preferably have a first distance to the fourth slot, which is equal to the first distance between the second slot and the first slot.

The rotating field generated by such a winding has fewer disturbing harmonics and thus has fewer torque ripples and smaller torque fluctuations, and also better NVH properties.

The third slot may additionally preferably lie adjacent to and on a same adjacent side in the circumferential direction with respect to the first slot as the fourth slot lies with respect to the second slot.

In one embodiment of the invention, the stator may have a first and a second end face, and the first and second pins may be connected to one another on the second end face by means of a first connection type, the second pin and the third pin may be connected to one another on the first end face by means of a second connection type, the third pin and the fourth pin may be connected to one another on the second end face by means of a third connection type, the fourth and the fifth pin may be connected to one another on the first end face by means of a fourth connection type, the fifth and the sixth pin may be connected to one another on the second end face by means of a fifth connection type, wherein the first, second, third, fourth, and fifth connection types differ from one another.

The different connection types enable an improved manufacturing. An alternating location of the connection types on different end faces enables the efficient formation of a winding about the stator teeth lying between the slots.

Even connection types on the same end face of the stator may differ due to different bending directions of a pin foot toward the stator interior or exterior.

In one embodiment of the invention, one pin of a winding may be a first, sixth, seventh, or twelfth end pin and be designed as a single pin, for example, as an I pin.

The stator may preferably have at least two windings, and at least the sixth pin in the second slot may be connected to a seventh pin in the 6n-1 layer in a third slot by means of a sixth connection type.

A combination of the previously listed connection types on different end faces or the same end face of the stator is also possible. A simple and fast manufacturing is possible due to one same connection type on the same end faces, and different connection types on different end faces of the stator. For example, the connection is established by a type of pre-bent pins, so-called double pins or also U pins on one end face, and pins are welded to one another individually or one side of the double pin in each case is welded on another end face of the stator. The weld spots may contact the feet of the pins or double pins.

Additionally preferably, the stator may have a plurality of windings, which extend across the entire circumference of the stator and thereby form a partial coil.

The windings thus have a symmetry which generates a uniform rotating field.

In another embodiment, one pin respectively from three partial coils may be connected to one another by means of a seventh connection type or an eighth connection type and form a coil. These pins may be so-called end pins, because they mark the end of a partial coil.

The partial coils may preferably form six coils, and these may be assigned to three phases in such a way that in each case, two coils, which are assigned to a same phase, may be located in four adjacent slots.

One input respectively of an end pin of two coils may additionally preferably be connected to one another by means of a ninth connection type.

The ninth connection type may be established by a conductor applied to the pins or by a conducting ring.

The two coils may be connected in parallel and may additionally be supplied by a same phase. The parallel connection may be carried out by the paired connection of a first and seventh end pin or of a sixth and twelfth end pin.

Two coils in the same slots may be switched in parallel and supplied by one phase, so that a stator results with windings for a three-phase electric machine.

Furthermore, two phases may respectively have an approximately identical current and voltage curve, and thus a six-phase inverter may only control a three-phase motor. A current division of the switching elements is possible in the inverter using this arrangement.

According to the invention, a vehicle has an electric machine with a stator according to one of the preferred embodiments.

DESCRIPTION OF THE DRAWINGS

FIG. 1 shows a stator 1 with a plurality of slots 5 in which pins 2, 3 are guided. Stator 1 has a first end face 7 and a second end face 9 lying opposite. Naturally, a rotor is additionally necessary to operate an electric machine.

FIG. 2 shows a stator 1 with slots and pins on six layers, wherein only eight slots 51-58 are depicted. Pins 21, 22, 25, 26, 27, 28 are arranged in the slots by way of example. The pins lie adjacent to one another in one slot. In the example from FIG. 2, there is space in one slot for six adjacent pins. The six pins within one slot thus lie on different concentric circles L1, L2, L3, L4, L5, L6 around center M of the stator, which thus form individual layers. A first distance 11 lies between two respective slots and is identical between all slots shown in FIG. 2.

FIG. 3 shows stator 1 from FIG. 2. The pins are still arranged on concentric circles, thus layers, wherein the concentric circles are not marked for the sake of a better depiction. FIG. 3 depicts which pins are serially connected to one another. A first end pin 21 is located in a first slot 51 in layer L5. This first pin 21 is connected to a second pin 22 in a second slot 52 by means of a first connection type 61, depicted as a solid line. Second pin 22 is located in layer L6. A first distance 11, which is equal to distance 11 from FIG. 2, lies between first slot 51 and second slot 52.

Figure 1:
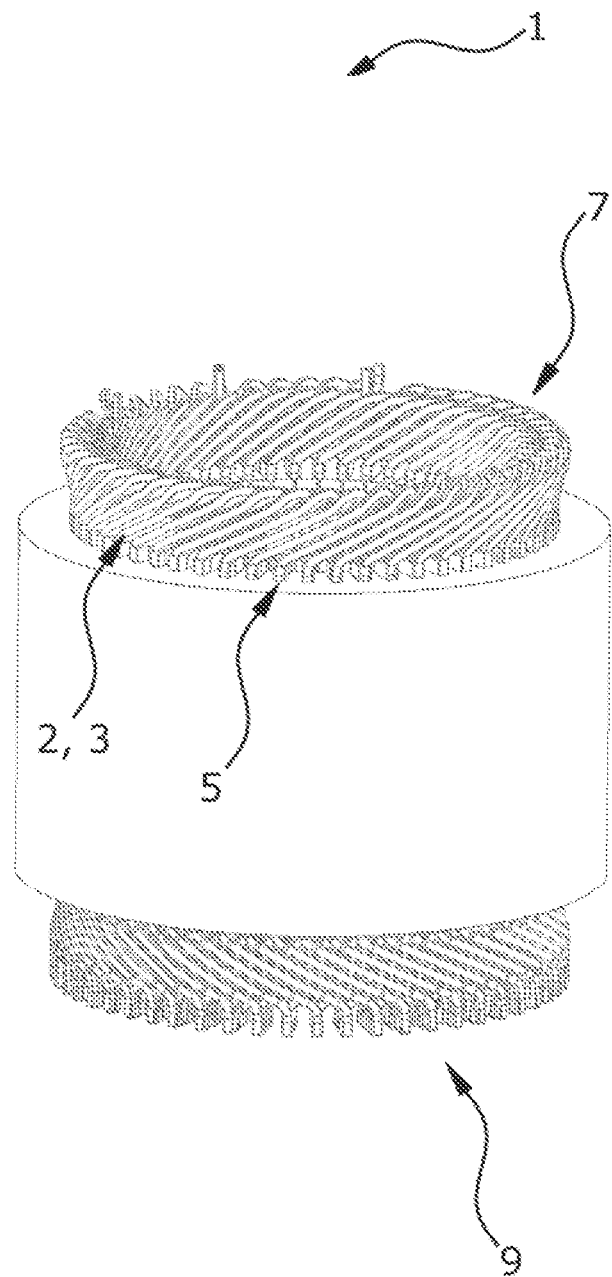
FIG. 1 shows a stator.

Second pin 22 is connected to a third pin 23 in a third slot 71 by means of a second connection type 62, depicted as a dashed line. Third pin 23 lies in layer L4. Third slot 71 lies directly adjacent to first slot 51. A fourth distance 17, which is one slot longer than first distance 11, lies between third slot 71 and second slot 52. Third pin 23 is connected to a fourth pin 24 via a third connection type 63, depicted as a densely dotted line. Fourth pin 24 lies in a fourth slot 72. Fourth pin 24 lies in layer L3. Fourth slot 72 lies directly adjacent to second slot 52. A second distance 13, which is one slot shorter than first distance 11, and two slots shorter than fourth distance 17, lies between fourth slot 72 and first slot 51.

Fourth pin 24 is connected to a fifth pin 25 in first slot 51 by means of a fourth connection type 64, depicted as a loosely dashed line. Fifth pin 25 is located in turn in first slot 51, thus in the same slot as first pin 21. Fifth pin 25 lies in layer L1. There is thus still space for three other pins in layers L2-L4 between first pin 21 and fifth pin 25 in first slot 51. In addition, there is still space in first slot 51 for a further pin in layer L6. Fifth pin 25 is connected to a sixth pin 26 via a fifth connection type 65, depicted as a loosely dotted line. Sixth pin 26 lies in second slot 52, thus the same slot as second pin 22. Sixth pin 26 lies in layer L2. There is thus still space for three other pins in layers L3-L5 between second pin 22 and sixth pin 26 in second slot 52. In addition, there is still space in second slot 52 for a further pin in layer L1.

The connection of the first, second, third, fourth, fifth, and sixth pins forms a first winding 41. First pin 21 is also simultaneously a first end pin. This end pin has an input 101 for connecting to an energy source, for example, an inverter. First end pin 21 is therefore only connected to one other pin, thus to second pin 22. First end pin 21 may thus be configured as a so-called single pin or I pin.

Sixth pin 26 is connected to a seventh pin 27 in layer L2 in a first slot 53 via a sixth connection type 66, depicted as a dotted line. At seventh pin 27, the previously-described serial connection of the consecutive pins in the stator begins again, wherein seventh pin 27 is similar to first pin 21 with an offset of the slot by 90 degrees. In contrast to first pin 21, seventh pin 27 is not an end pin, as seventh pin 27 is connected to two other pins, thus to sixth pin 26 and to another pin in slot 54, layer L6.

The serial connection of seventh pin 27 to other pins in three other slots 54, 73, and 74 forms a second winding 42. First, second, third, fourth, and fifth connection types 61-65 between these pins is identical to respective first, second, third, fourth, and fifth connection types 61-65 of the pins of first winding 41.

The two windings 41, 42 are connected by sixth connection type 66. Due to the continuation of the serial connection, a third winding 43 is formed in four other slots 55, 56, 75, and 76. Windings 41, 42, 43 are each connected using sixth connection type 66. Sixth connection type 66 between the respective windings is thus identical. First, second, third, fourth, and fifth connection types 61-65 between the pins of third winding 43 are also identical to first, second, third, fourth, and fifth connection types 61-65 of first and second windings 41, 42.

Due to the continuation of the serial connection, fourth winding 44 is formed in four other slots 57, 58, 77, and 78. Windings 41, 42, 43, 44 are each connected using sixth connection type 66. Sixth connection type 66 between the respective windings is thus identical. First, second, third, fourth, and fifth connection types 61-65 between the pins of fourth winding 44 are also identical to first, second, third, fourth, and fifth connection types 61-65 of first, second, and third windings 41, 42, 43.

Four windings 41, 42, 43, 44 form a first partial coil by way of one circuit counter-clockwise about stator 1. First pin 21 additionally has an input 81 for connecting to an energy source. First pin 21 of winding 41 thus represents a first end pin. The partial coil ends with pin 28 of fourth winding 44. Last pin 28 of fourth winding 44 thus represents a second end pin. Second end pin 28 has, however, in contrast to first end pin 21, connections to two other pins, as is explained in connection to FIG. 6.

Figure 3:
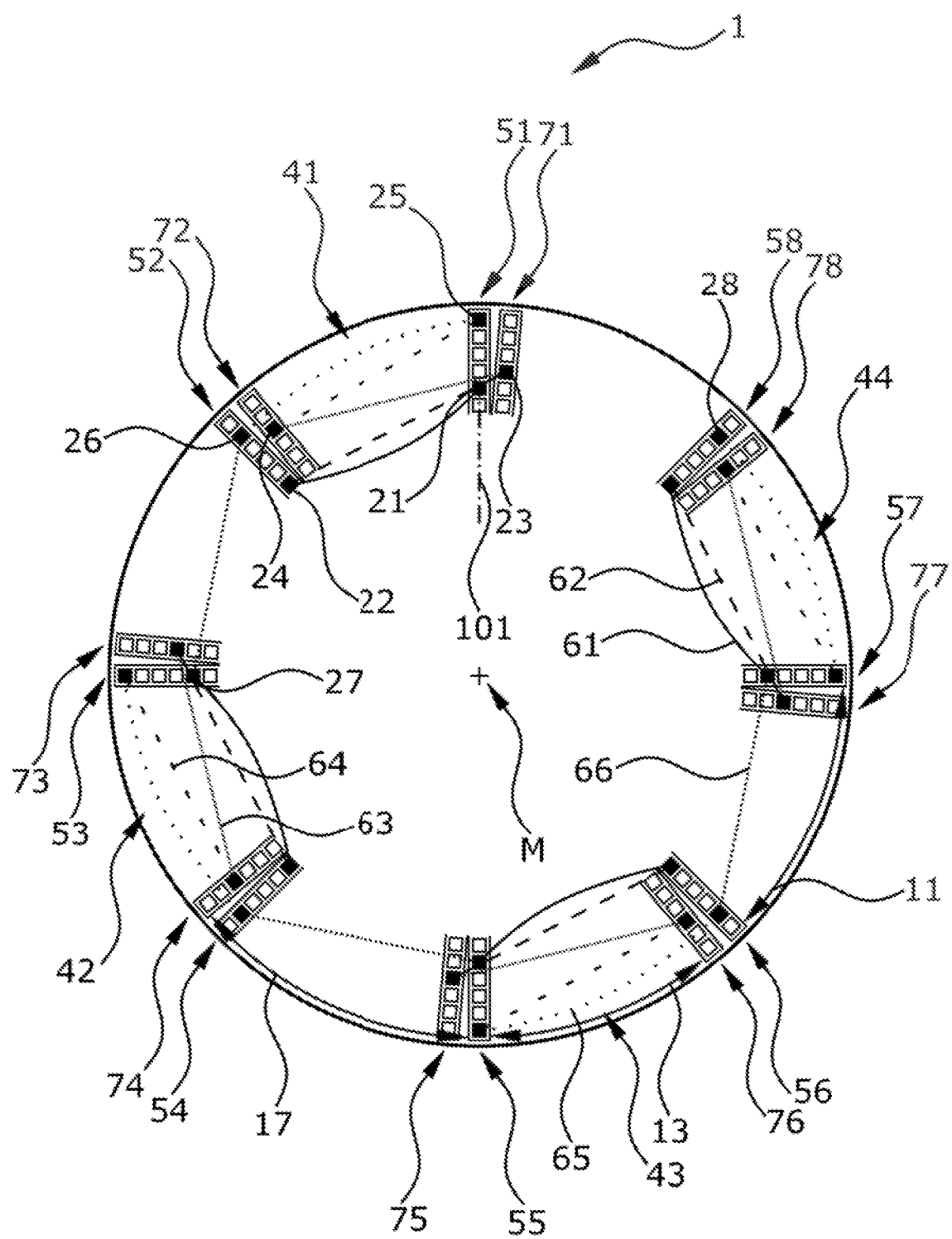
FIG. 3 shows a winding scheme of a first partial coil.
Figure 4:
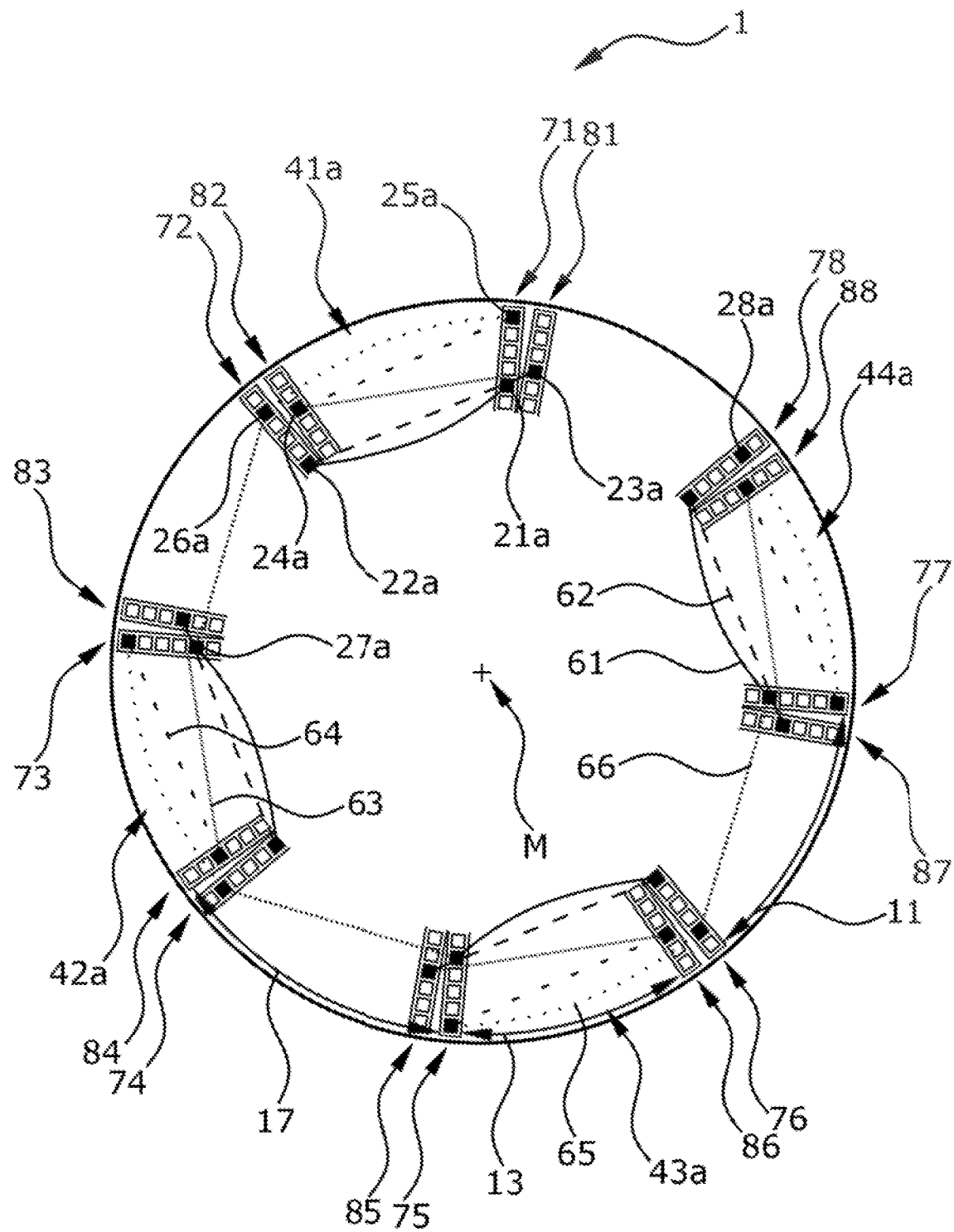
FIG. 4 shows a winding scheme of a second partial coil.

FIG. 4 shows stator 1 from FIG. 3, wherein eight other slots 81-88 are shown, which are located directly adjacent to slots 71-78 from FIG. 3. Distances 11, 13, 17 have the same lengths as in FIG. 3.

Pins 21a-28a are connected in the same way as pins 21-28 of FIG. 3. Even the connection types are identical with FIG. 3 and are clearly expressed by identical reference numerals. Windings 41a, 42a, 43a, 44a are formed in the same way as is described in FIG. 3, and connected counterclockwise to one another by sixth connection type 66.

Four windings 41a, 42a, 43a, 44a form a second partial coil by way of one circuit about stator 1. The partial coil begins with a pin 21a, which is a third end pin. Third end pin 21a has, however, in contrast to first end pin 21, connections to two other pins, as is explained in connection to FIG. 6. The partial coil ends with pin 28a of winding 44a. Last pin 28a of winding 44a thus represents a fourth end pin.

Figure 5:
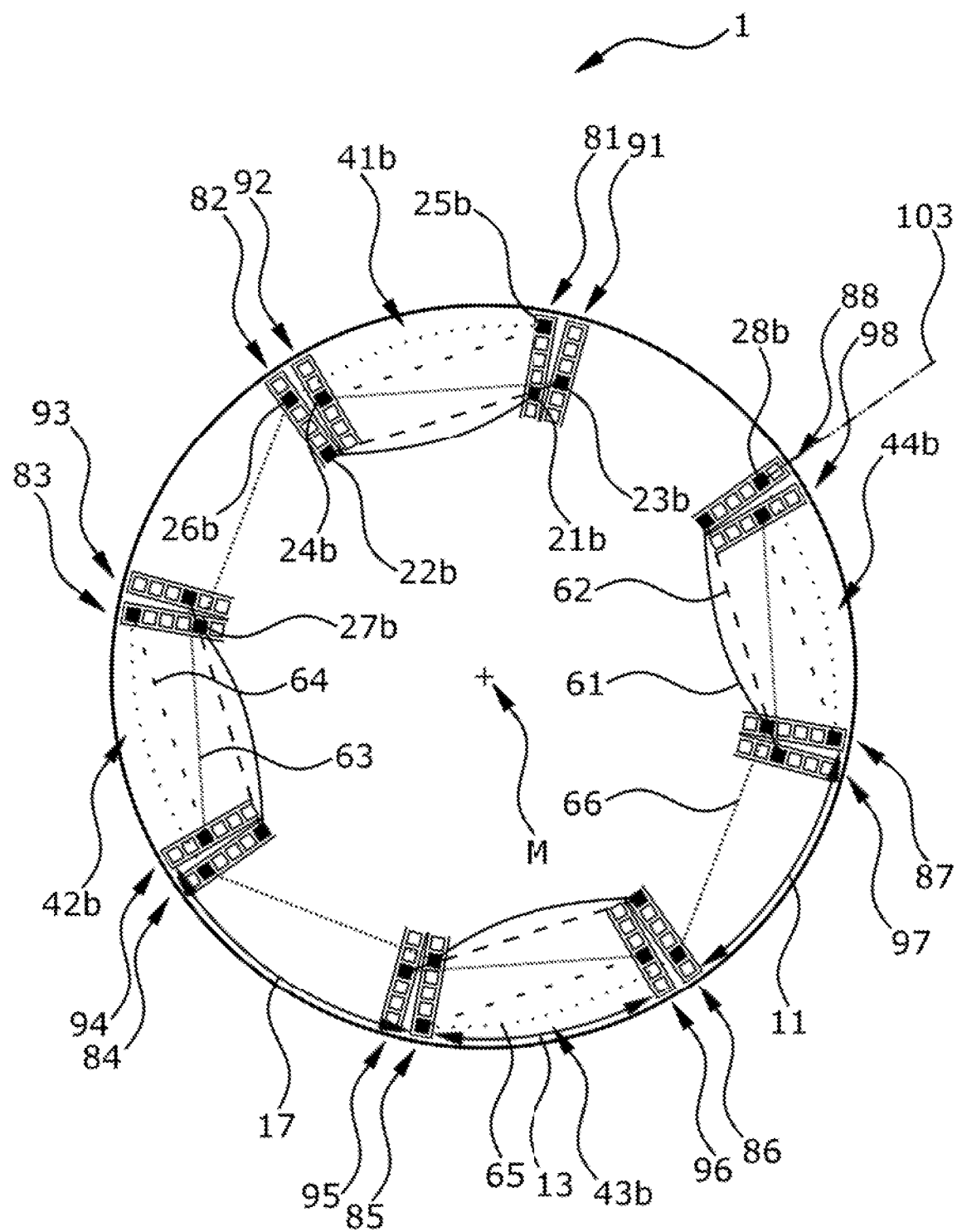
FIG. 5 shows a winding scheme of a third partial coil.

FIG. 5 shows stator 1 from FIGS. 3 and 4, wherein eight other slots 91-98 are shown, which are located directly adjacent to slots 81-88 from FIG. 4. Distances 11, 13, 17 have the same lengths as in FIG. 3.

Pins 21b-28b are connected in the same way as pins 21-28 of FIG. 3 and pins 21a-28a of FIG. 4. Even the connection types are identical with FIGS. 3 and 4 and are clearly expressed by identical reference numerals. Windings 41b, 42b, 43b, 44b are formed in the same way as is described in FIGS. 3 and 4, and connected counterclockwise to one another by sixth connection type 66.

Four windings 41b, 42b, 43b, 44b form a third partial coil by way of one circuit about stator 1. The partial coil begins with a pin 21b, which is a fifth end pin. Fifth end pin 21b has, however, in contrast to first end pin 21, connections to two other pins, as is explained in connection to FIG. 6. The partial coil ends with pin 28b of winding 44b. Last pin 28b of winding 44b thus represents a sixth end pin. Sixth end pin 28b is in turn designed similar to the first end pin, thus, for example, as a single pin or I pin and has an output 103 for connecting to an energy source.

Figure 6:
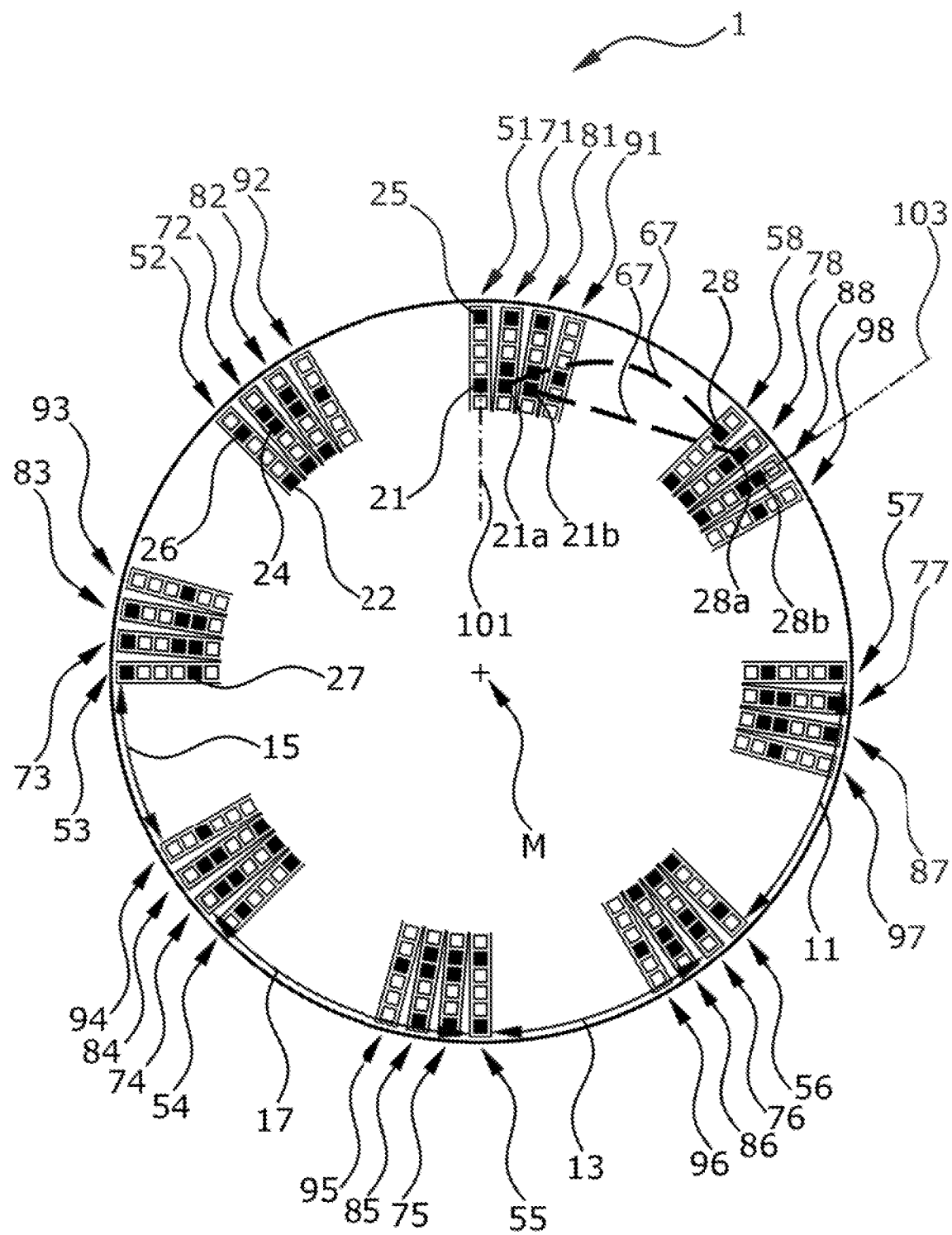
FIG. 6 shows a stator with three partial coils and their connection to one another and thus a first coil.

FIG. 6 shows a pin assignment by the first, second, and third partial coils from FIGS. 3, 4, and 5, which are represented by black squares. Identical reference numerals designate identical pins, slots, connections in the figures.

Second end pin 28 of winding 44 of the first partial coil in slot 58, layer L2 and third end pin 21a of first winding 41a of the second partial coil in slot 71, layer L5 are connected by a seventh connection type 67. The seventh connection type bridges a second distance 13. Fourth end pin 28a of winding 44a of the second partial coil in slot 78, layer L2 and fifth end pin 21b of first winding 41b of the third partial coil in slot 81, layer L5 are connected by a seventh connection type 67. The seventh connection type bridges a second distance 13.

Seventh connection type 67 thus connects two partial coils respectively, wherein three partial coils form a first coil 201 with an input 101 and an output 103 after three radial circuits counterclockwise about the stator. A third distance 15, depicted in the figure, is three slots shorter than first distance 11 from the previous figures. The blocks of the four adjacent slots, which are occupied by pins of the coil, have in each case the third distance from one another.

Figure 2:
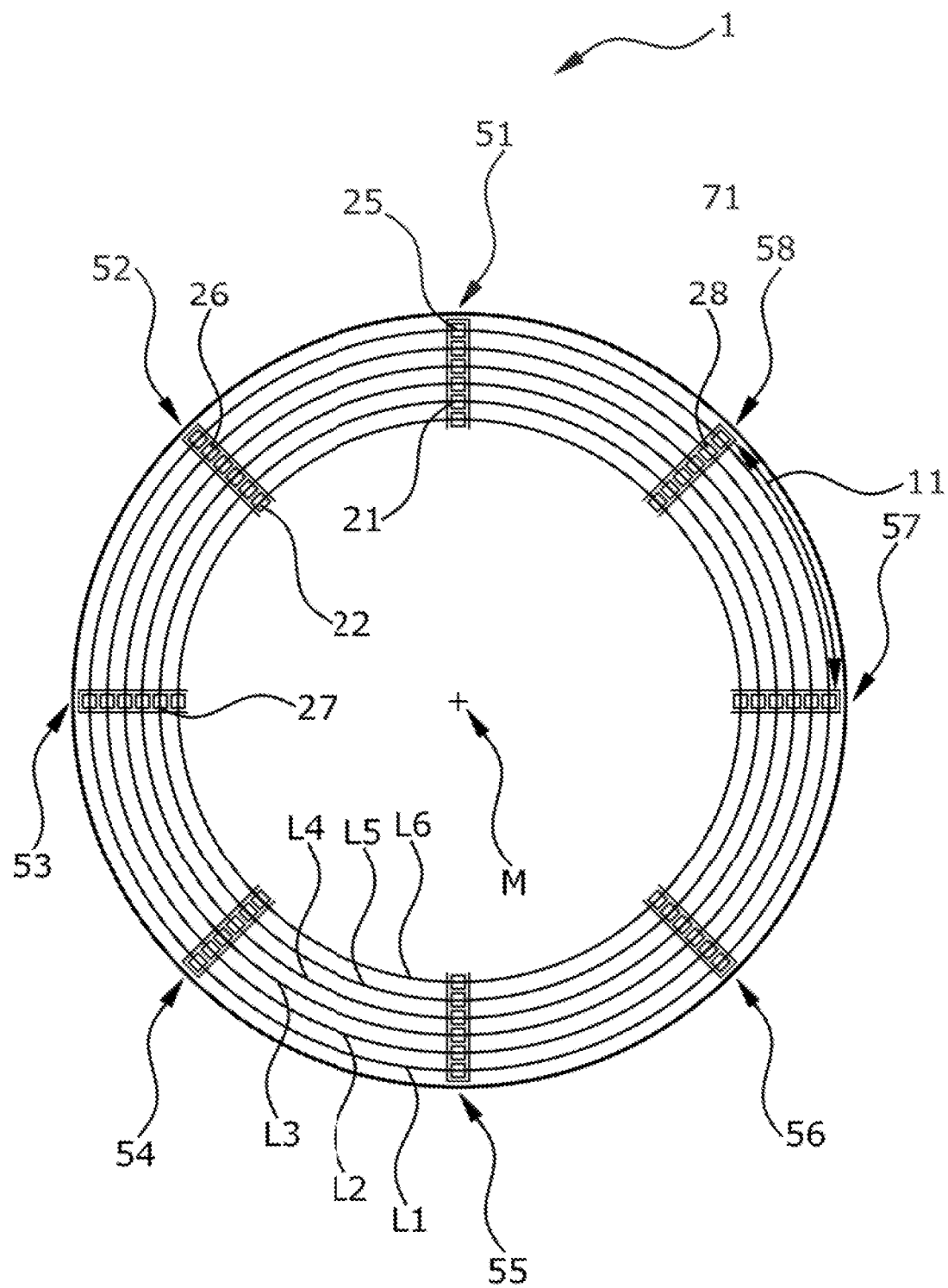
FIG. 2 shows a stator with eight slots and six layers.
Figure 7:
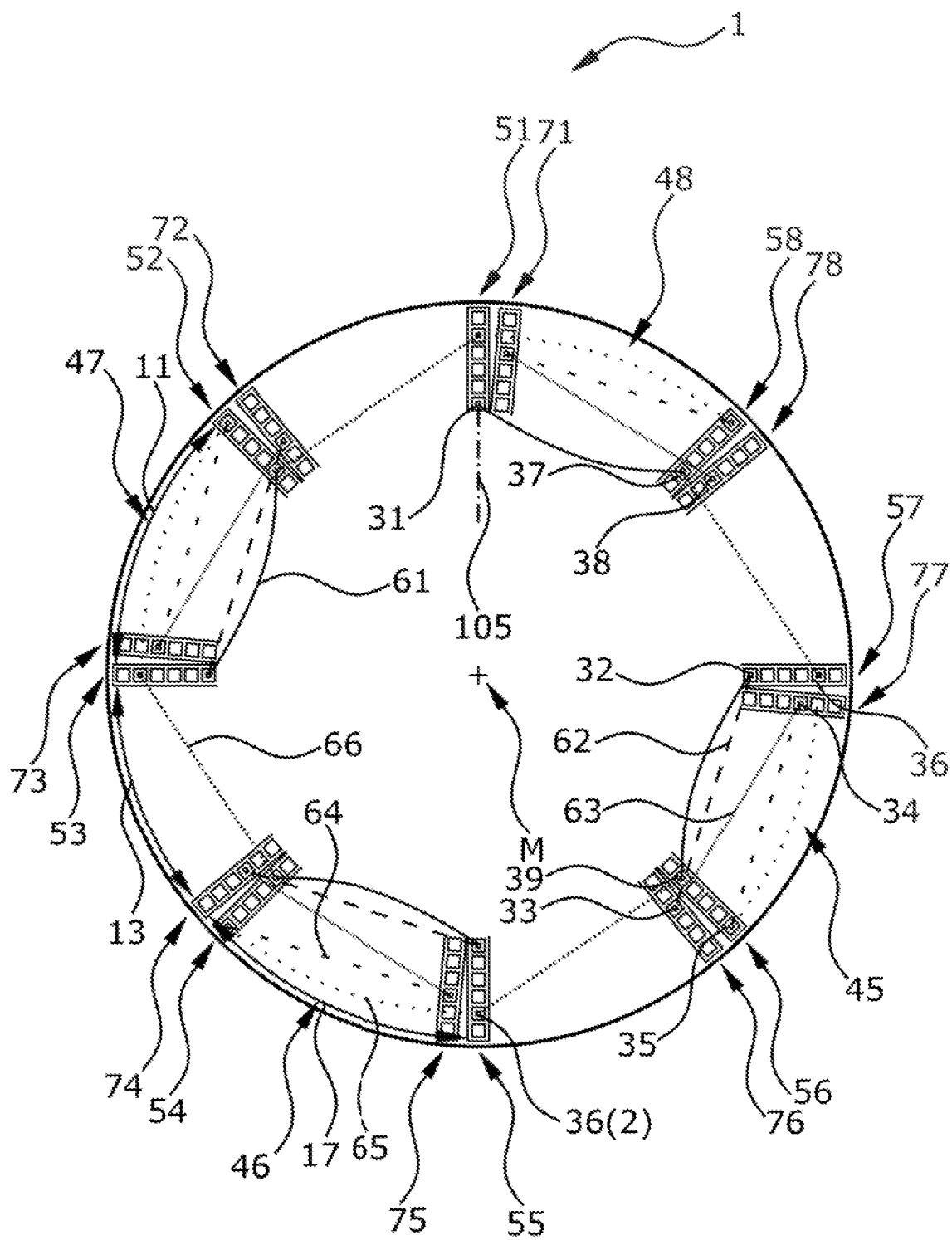
FIG. 7 shows a winding scheme of another first partial coil.

FIG. 7 shows stator 1 from FIG. 2. The pins are still arranged on concentric circles, thus layers, wherein the concentric circles are not marked for the sake of a better depiction. It depicts which pins, depicted as black squares on a white background, are serially connected to one another and form a first partial coil of a second coil 202.

A first end pin 31 is located in first slot 51 in layer L6. First pin 31 is also simultaneously a seventh end pin 31. This end pin 31 has an input 105 for connecting to an energy source, for example, an inverter. Seventh end pin 31 is therefore only connected to one other pin, thus to seventh pin 37. Seventh end pin 31 may thus be configured as a so-called single pin or I pin. First pin 31 is connected to a seventh pin 37 in a slot 58 by means of a first connection type 61, depicted as a solid line. Seventh pin 37 is located in layer L5. A first distance 11, which is equal to distance 11 from FIG. 2, lies between first slot 51 and slot 58.

Seventh pin 37 is connected to a sixth pin 36 in a slot 57 via a sixth connection type 66, depicted as a dotted line. Sixth pin 36 lies in layer L2. Sixth pin 36 is connected to a fifth pin 35 in slot 56 via a fifth connection type 65, depicted as a loosely dotted line. Fifth pin 35 lies in layer L1. Fifth pin 35 is connected to a fourth pin 34 in a slot 77 by means of fourth connection type 64, depicted as a loosely dashed line. Second distance 13 lies between slot 77 and slot 56.

Fourth pin 34 is connected to a third pin 33 via third connection type 63, depicted as a densely dotted line. Third pin 33 lies in a slot 76. Third pin 33 lies in layer L4. Slot 76 lies directly adjacent to slot 56. Third pin 33 is connected to a second pin 32 in slot 57 via second connection type 62, depicted as a short dashed line. Second pin 32 lies in layer L6. Second pin 32 lies in slot 57, thus the same slot as sixth pin 36. Sixth pin 36 lies in layer L2. There is thus still space for three other pins in layers L3-L5 between second pin 32 and sixth pin 36 in slot 57. In addition, there is still space in slot 57 for a further pin in layer L1.

Second pin 32 is connected to a ninth pin 39 in slot 56 via first connection type 61, depicted as a solid line. Ninth pin 39 lies in layer L4. Ninth pin 39 is located in turn in slot 56, thus in the same slot as fifth pin 35. Fifth pin 35 lies in layer L1. There is thus still space for three other pins in layers L2-L4 between ninth pin 39 and fifth pin 35 in slot 56. In addition, there is still space in slot 56 for a further pin in layer L6.

The connection of the second, third, fourth, fifth, sixth, and ninth pins forms a fifth winding 45.

Ninth pin 39 is connected to a tenth pin 36(2) via sixth connection type 66, depicted as a densely dotted line. Tenth pin (36(2)) lies in slot 55 in layer L2. At tenth pin 36(2), the previously-described serial connection of the consecutive pins in the stator begins again, wherein tenth pin 36(2) is similar to sixth pin 36 with an offset of the slot by 90 degrees.

The serial connection of tenth pin 36(2) to other pins in three other slots 54, 75, and 74 forms a sixth winding 46. First, second, third, fourth, and fifth connection types 61-65 between these pins is identical to respective first, second, third, fourth, and fifth connection types 61-65 of the pins of first through fifth windings 41-45.

The two windings 45, 46 are connected by sixth connection type 66. Due to the continuation of the serial connection, a seventh winding 47 is formed in four other slots 53, 52, 73, and 72. Windings 45-47 are each connected using sixth connection type 66. Sixth connection type 66 between the respective windings is thus identical. First, second, third, fourth, and fifth connection types 61-65 between the pins of seventh winding 47 are also identical to first, second, third, fourth, and fifth connection types 61-65 of preceding windings 41-46.

Due to the continuation of the serial connection, eighth winding 48 is formed in four other slots 51, 58, 71, and 78. Windings 45, 46, 47, 48 are each connected using sixth connection type 66. Sixth connection type 66 between the respective windings is thus identical. First, third, fourth, and fifth connection types 61, 63-65 between the pins of eighth winding 48 are also identical to first, third, fourth, and fifth connection types 61, 63-65 of preceding windings 41-47. Furthermore, eighth winding 48 has two end pins 31, 38.

Four windings 45-48 form a first partial coil by way of one circuit clockwise about stator 1. The first partial coil of second coil 202 ends with an eighth end pin 38.

Figure 8:
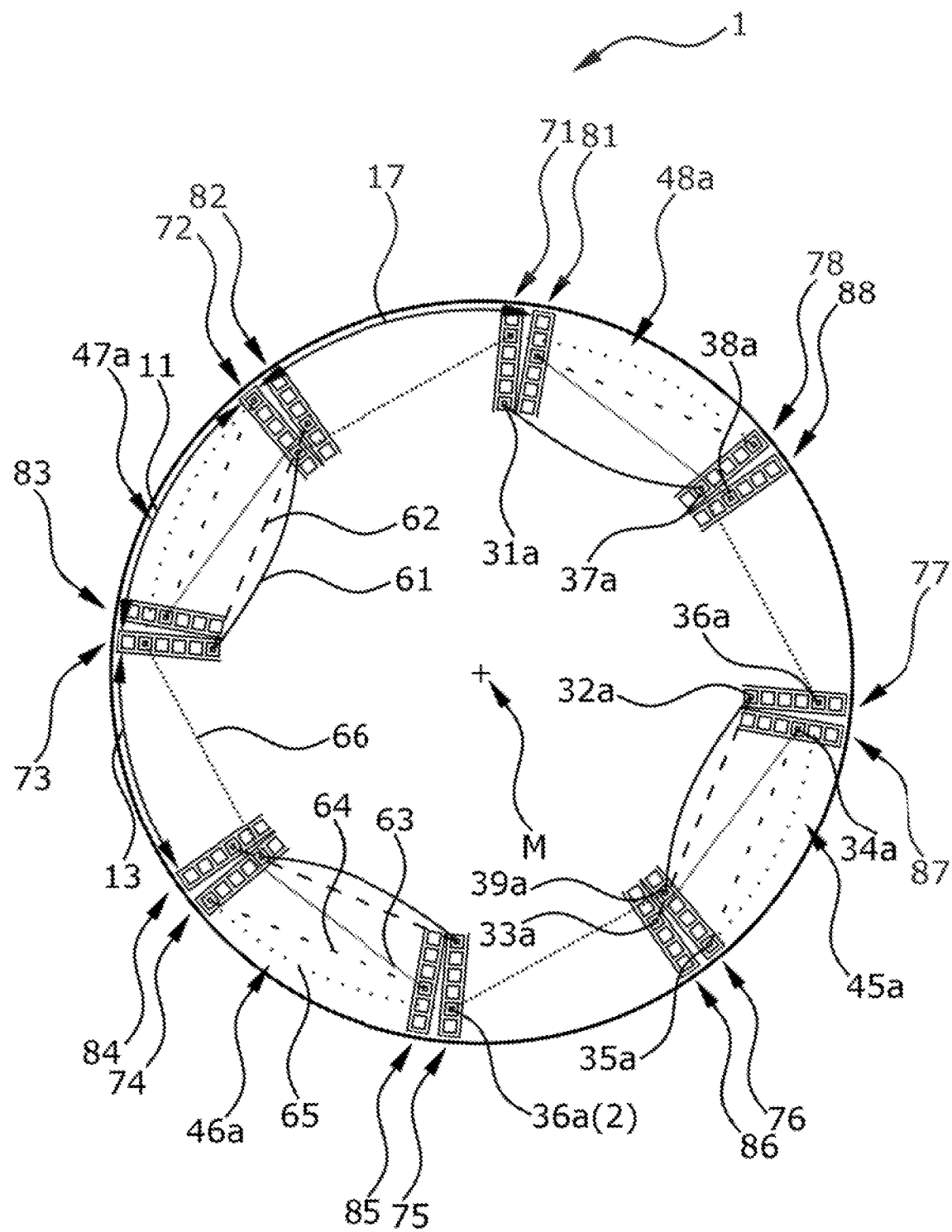
FIG. 8 shows a winding scheme of another second partial coil.

FIG. 8 shows stator 1 from FIG. 7, wherein eight other slots 81-88 are shown, which are located directly adjacent to slots 71-78 from FIG. 7. Distances 11, 13, 17 have the same lengths as in the preceding figures.

Pins 31a-38a are connected in the same way as pins 31-38 of FIG. 7. Even the connection types are identical with the preceding figures and are clearly expressed by identical reference numerals. Windings 45a, 46a, 47a, 46a are formed in the same way as is described in FIG. 7, and connected clockwise to one another by sixth connection type 66.

Four windings 45a, 46a, 47a, 48a form a second partial coil by way of one circuit about stator 1. The partial coil begins with a pin 31a, which is a ninth end pin. Ninth end pin 31a has, however, in contrast to seventh end pin 31, connections to two other pins, as is explained in connection with FIG. 10. The partial coil ends with pin 38a of winding 48a. Pin 38a of winding 48a thus represents a tenth end pin 38a. Furthermore, eighth winding 48a has two end pins 31a, 38a.

Figure 9:
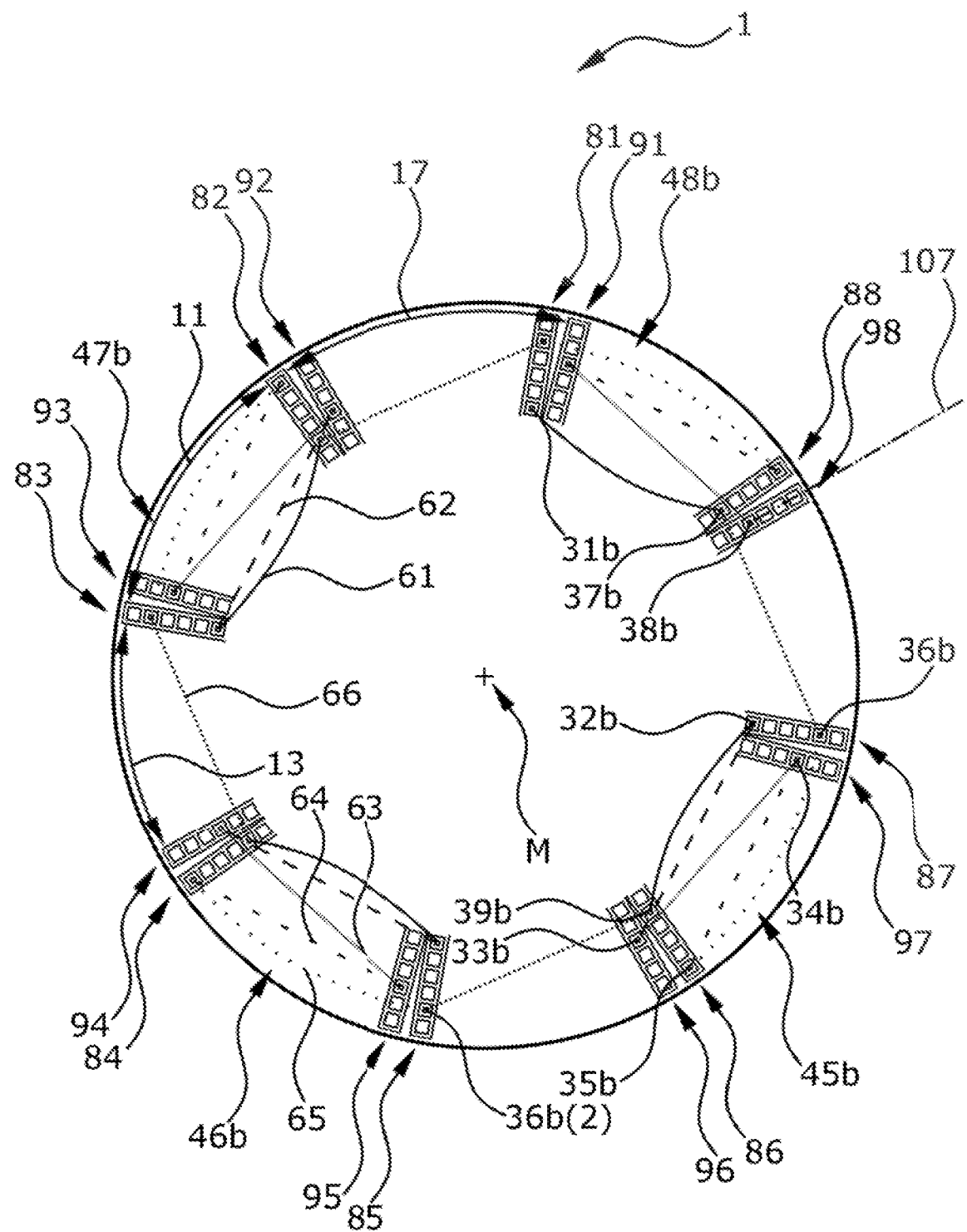
FIG. 9 shows a winding scheme of another third partial coil.

FIG. 9 shows stator 1 from FIGS. 7 and 8, wherein eight other slots 91-98 are shown, which are located directly adjacent to slots 81-88 from FIG. 7. Distances 11, 13, 17 have the same lengths as in the preceding figures.

Pins 31b-38b are connected in the same way as pins 31-38 of FIG. 7 and pins 31a-38a of FIG. 8. Even the connection types are identical with the preceding figures and are clearly expressed by identical reference numerals. Windings 45b, 46b, 47b, 48b are formed in the same way as is described in FIGS. 7 and 8, and connected clockwise to one another by sixth connection type 66.

Four windings 45b, 46b, 47b, 48b form a third partial coil by way of one circuit about stator 1. The partial coil begins with a pin 31b, which is an eleventh end pin. Eleventh end pin 31b has, however, in contrast to seventh end pin 31, connections to two other pins, as is explained in connection with FIG. 10. The partial coil ends with pin 38b of winding 48b. Pin 38b of winding 48b thus represents a twelfth end pin. Twelfth end pin 38b is in turn designed similar to the seventh end pin, thus, for example, as a single pin or I pin and has an output 107 for connecting to an energy source.

Figure 10:
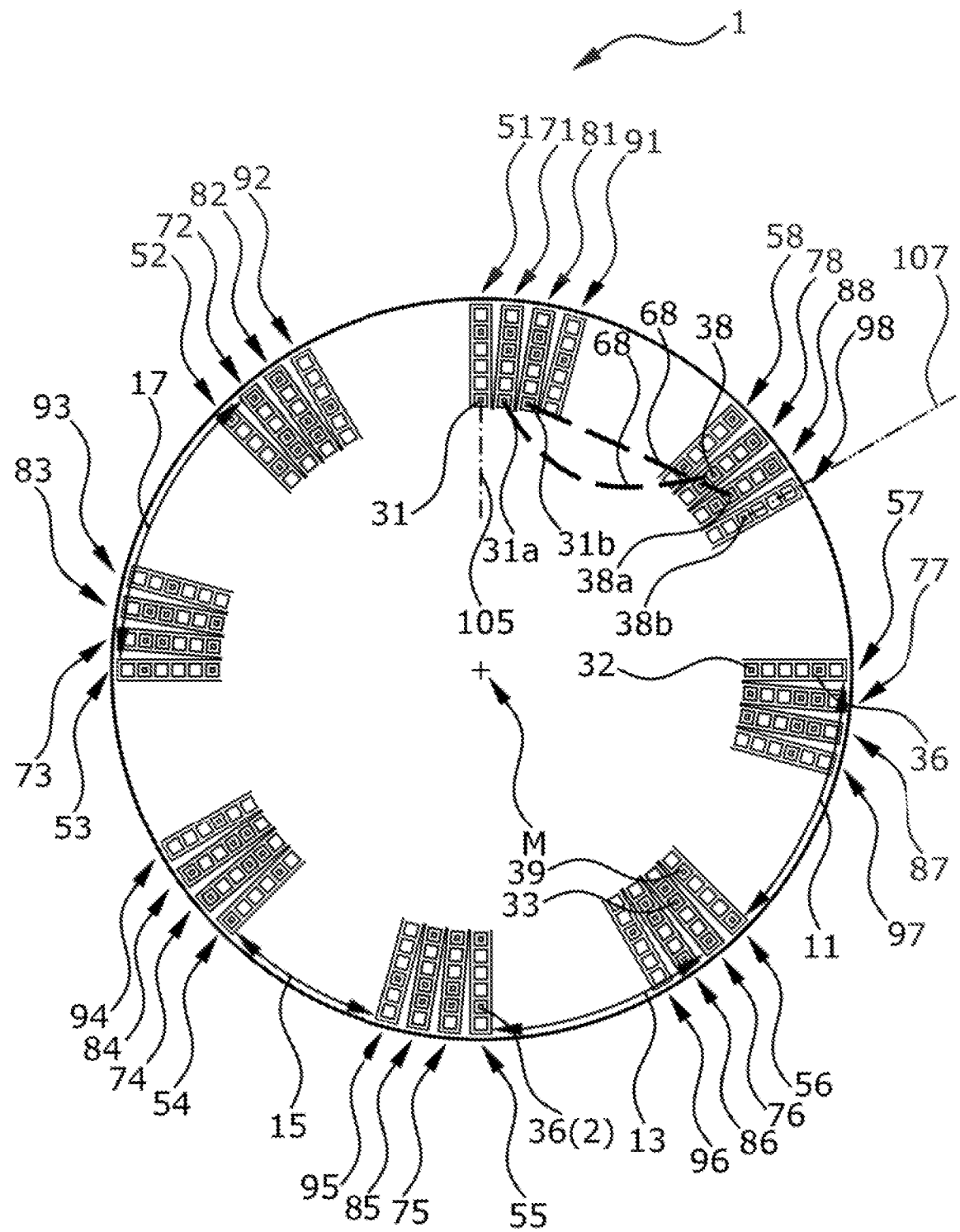
FIG. 10 shows a stator with three other partial coils and their connection to one another and thus a second coil.

FIG. 10 shows a pin assignment by the first, second, and third partial coils of second coil 202 from FIGS. 7, 8, and 9, which are represented by black squares on a white background. Identical reference numerals designate identical pins, slots, connections in the figures.

Eighth end pin 38 of eighth winding 48 of the first partial coil in slot 78, layer L4 and ninth end pin 31a of fifth winding 45a of the second partial coil in slot 71, layer L6 are connected by an eighth connection type 68. The eighth connection type bridges a first distance 11. Tenth end pin 38a of fifth winding 45a of the second partial coil in slot 88, layer L2 and eleventh end pin 31b of fifth winding 45b of the third partial coil in slot 81, layer L6 are connected by an eighth connection type 68. The eighth connection type bridges a first distance 11.

Eighth connection type 68 thus connects two partial coils respectively, wherein three partial coils form a second coil 202 with an input 105 and an output 107 after three radial circuits clockwise about the stator. A third distance 15, depicted in the figure, is three slots shorter than first distance 11 from the previous figures. The blocks of the four adjacent slots, which are occupied by pins of the coil, have in each case the third distance from one another.

Figure 11:
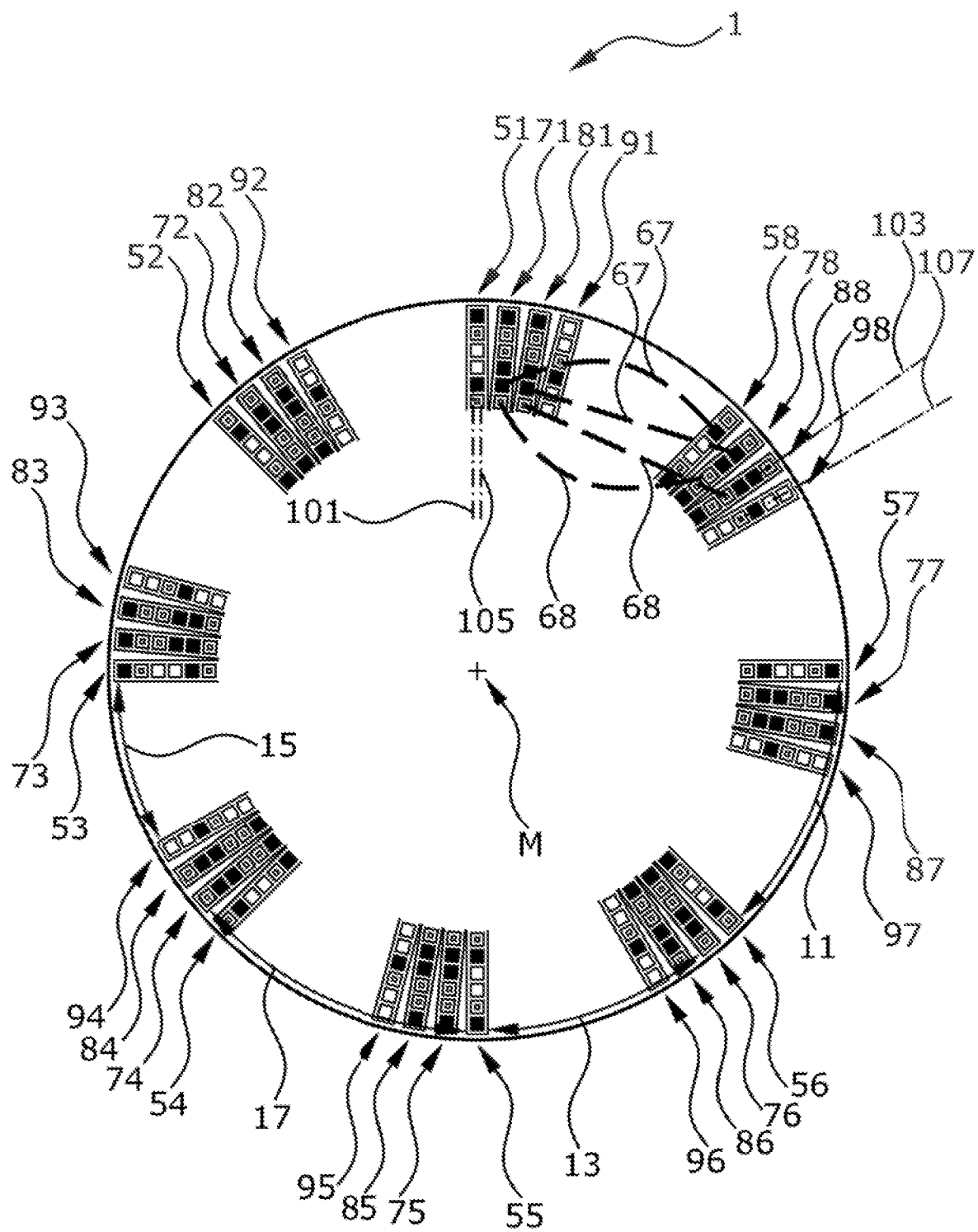
FIG. 11 shows a stator with two coils consisting of three partial coils respectively.

FIG. 11 shows a pin assignment by first coil 201 from FIG. 6, which is depicted by black squares. Identical reference numerals designate identical pins, slots, connections in the figures. Furthermore, second coil 202 from FIG. 10 is depicted as black squares on a white background, which are located in the same slots but in different layers. The partial coils of the two coils are connected by seventh connection type 67 (first coil) or eighth connection type 68 (second coil).

Figure 12:
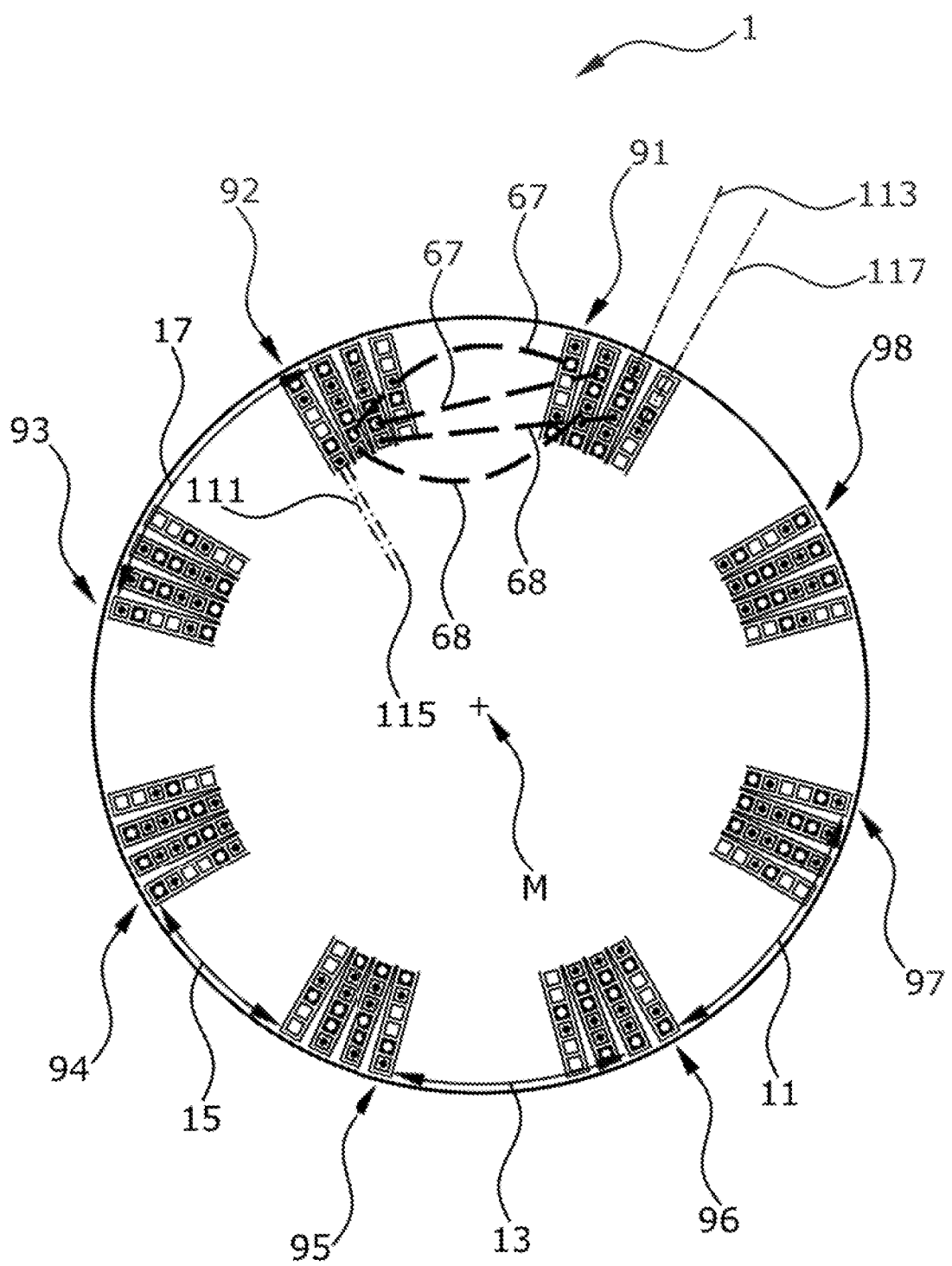
FIG. 12 shows a stator with two other coils.

FIG. 12 shows two other coils, as they are respectively formed by pins with a black dot or with a white dot. The three partial coils of the coil with the pins with a white dot are formed according to the description of FIGS. 3-6, wherein the slots are offset by 30 degrees in the counterclockwise direction. The three partial coils of the coil with the pins with a black dot are formed according to the description of FIGS. 7-10, wherein the slots are offset by 30 degrees in the counterclockwise direction.

Figure 13:
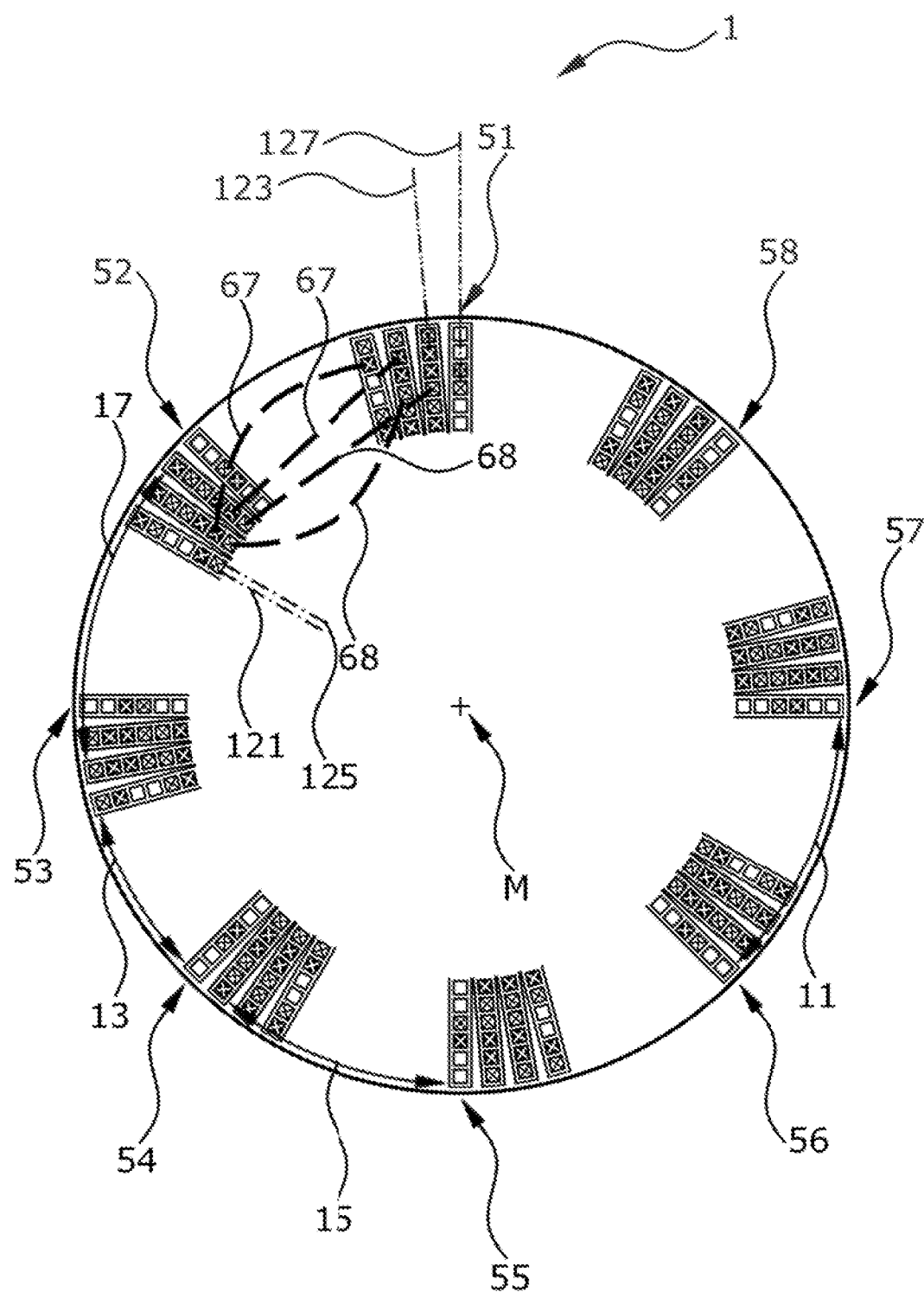
FIG. 13 shows a stator with two other coils.

FIG. 13 shows two other coils, as they are respectively formed by pins with a black cross or with a white cross. The three partial coils of the coil with the pins with a white cross are formed according to the description of FIGS. 3-6, wherein the slots are offset by 60 degrees in the counterclockwise direction. The three partial coils of the coil with the pins with a black cross are formed according to the description of FIGS. 7-10, wherein the slots are offset by 60 degrees in the counterclockwise direction.

Figure 14:
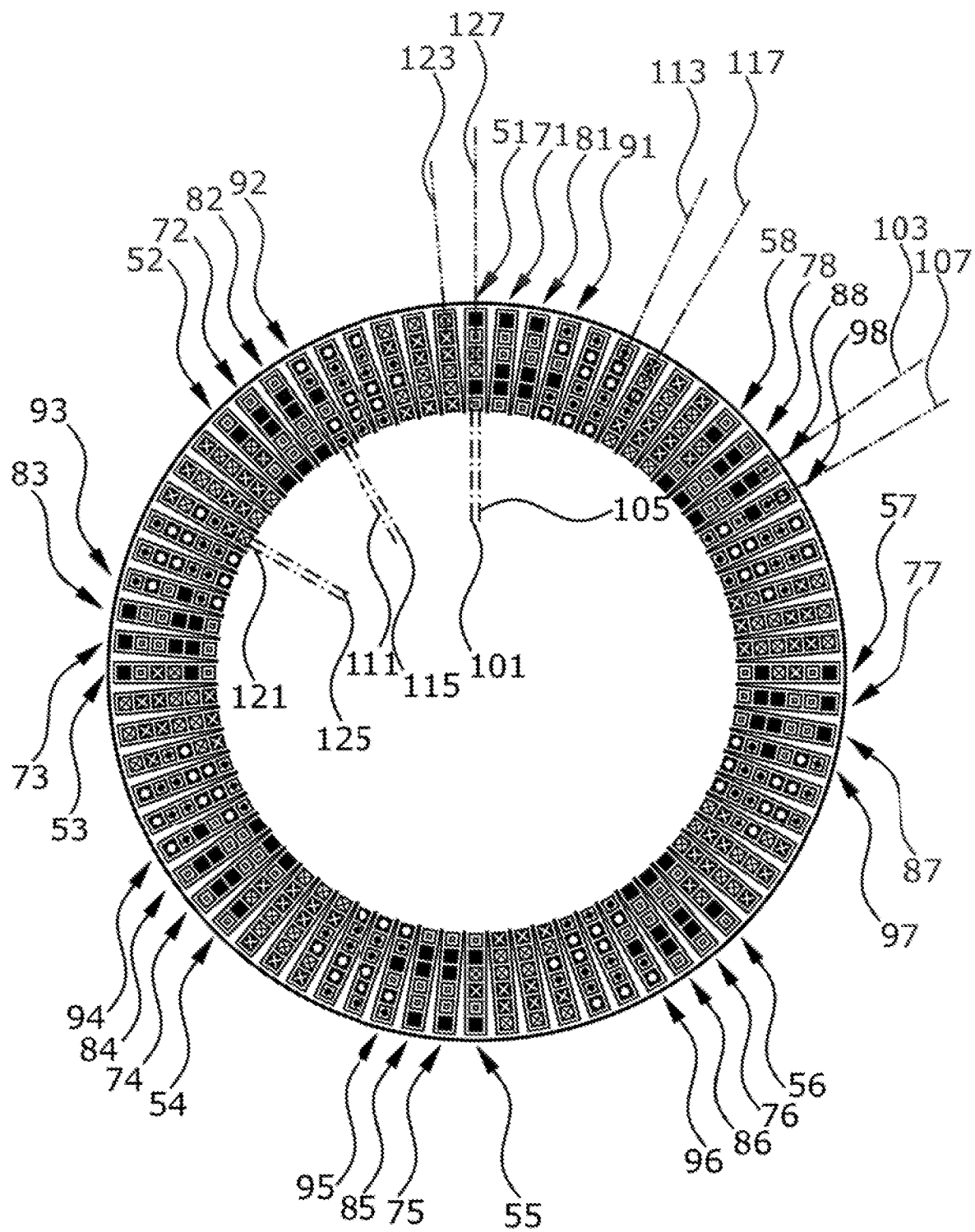
FIG. 14 shows a stator with six coils.

FIG. 14 shows a pin assignment by the six coils as a combination from FIGS. 10, 11, and 12. In particular, it is clear from the location of inputs 101, 105, 111, 115, 121, 125 and outputs 103, 107, 113, 117, 123, 127 that an interconnection of the coils may be carried out within twenty five slots. In the stator with seventy two slots, depicted by way of example, an interconnection of the inputs and outputs is thus possible within almost one-third of the stator circumference. Purely with reference to the inputs or outputs, a separate switching would be possible within thirteen slots.

Figure 15:
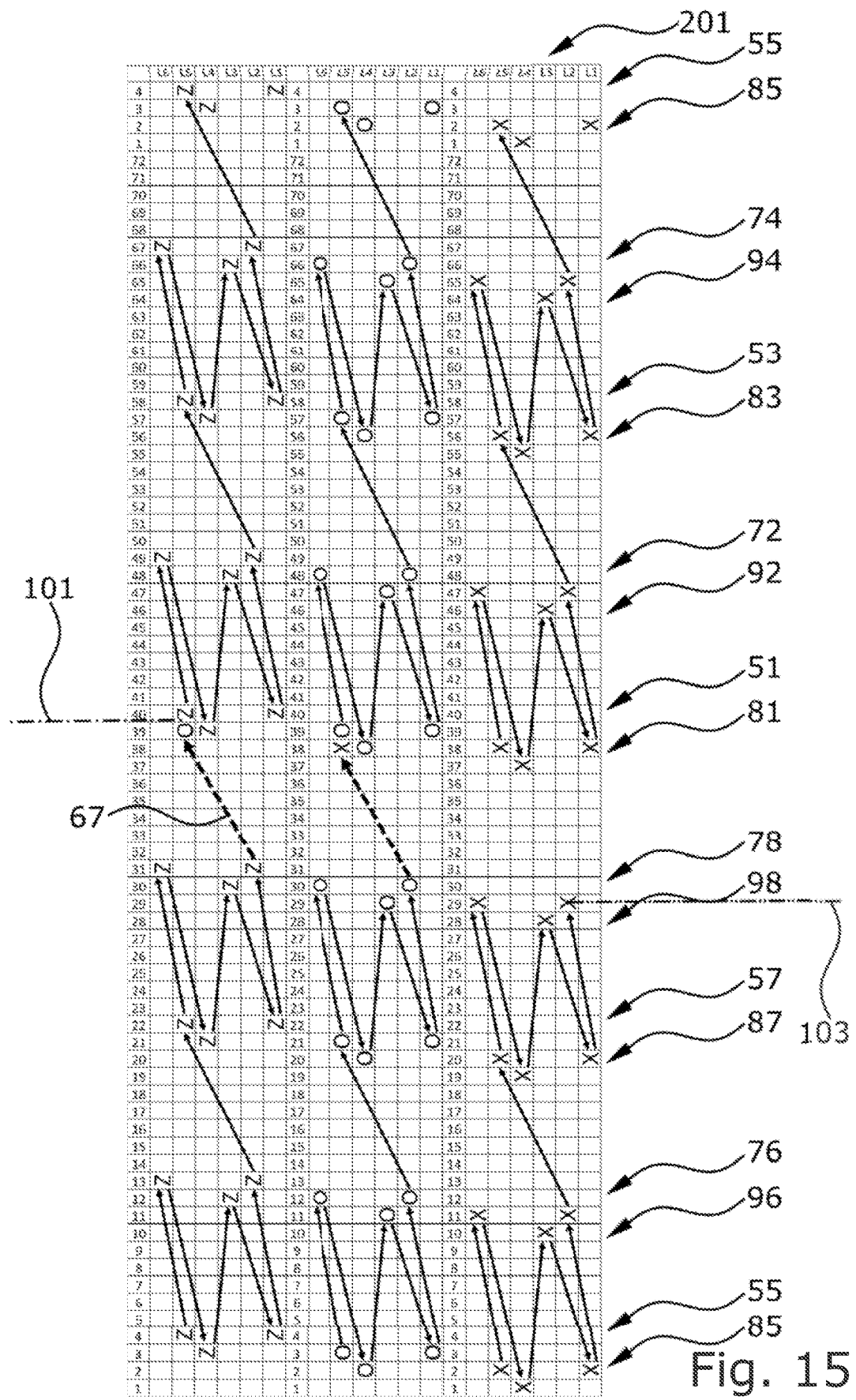
FIG. 15 shows a winding scheme of a first coil.

FIG. 15 shows the winding scheme of the three partial coils of first coil 201. The consecutive "slot number" is not a reference numeral. The reference numerals with arrows to the slots are identical to the preceding figures and enable a comparison with these figures.

Figure 16:
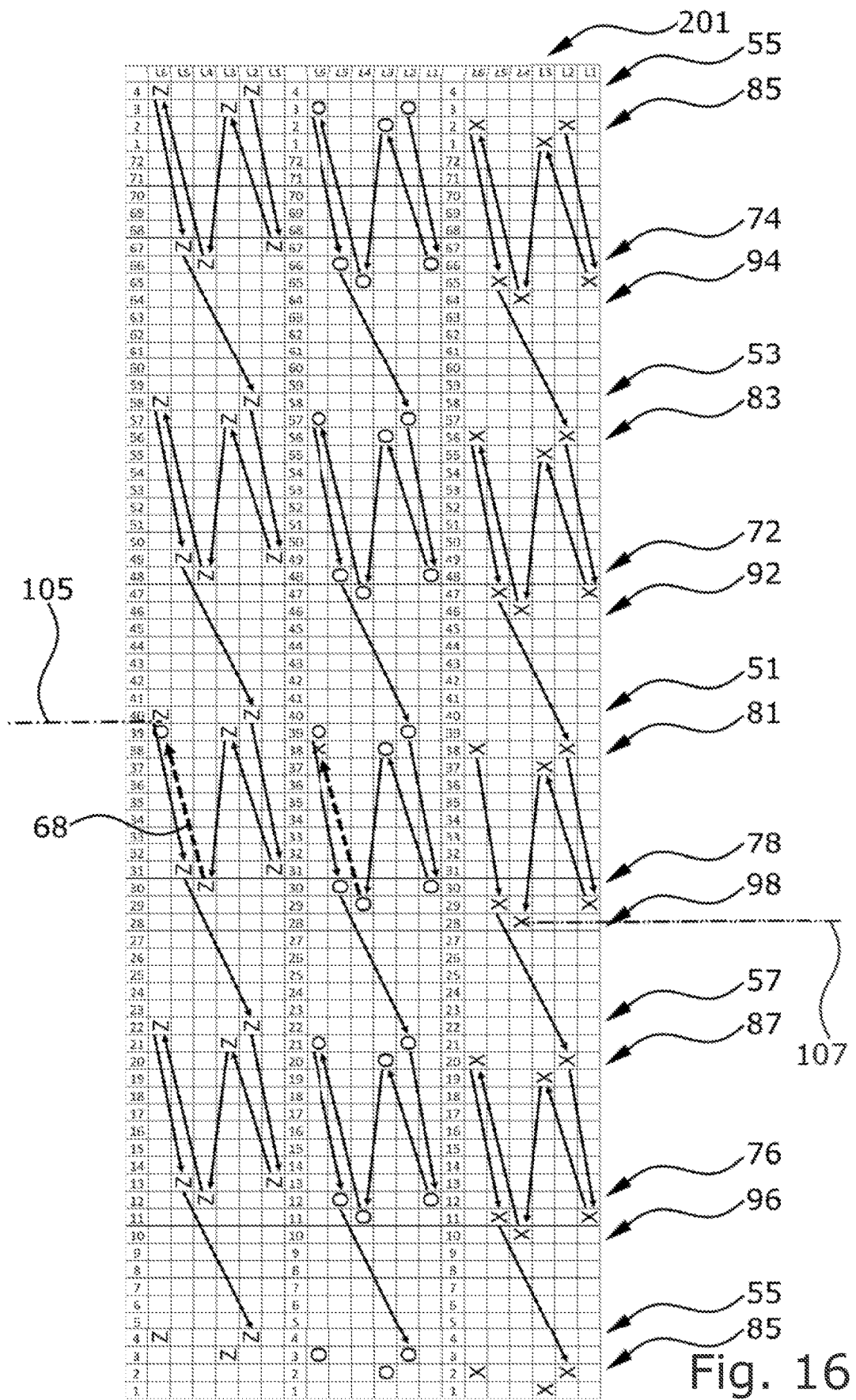
FIG. 16 shows a winding scheme of a second coil.

FIG. 16 shows the winding scheme of the three partial coils of second coil 202. The consecutive "slot number" is not a reference numeral. The reference numerals with arrows to the slots are identical to the preceding figures and enable a comparison with these figures.

Figure 17:
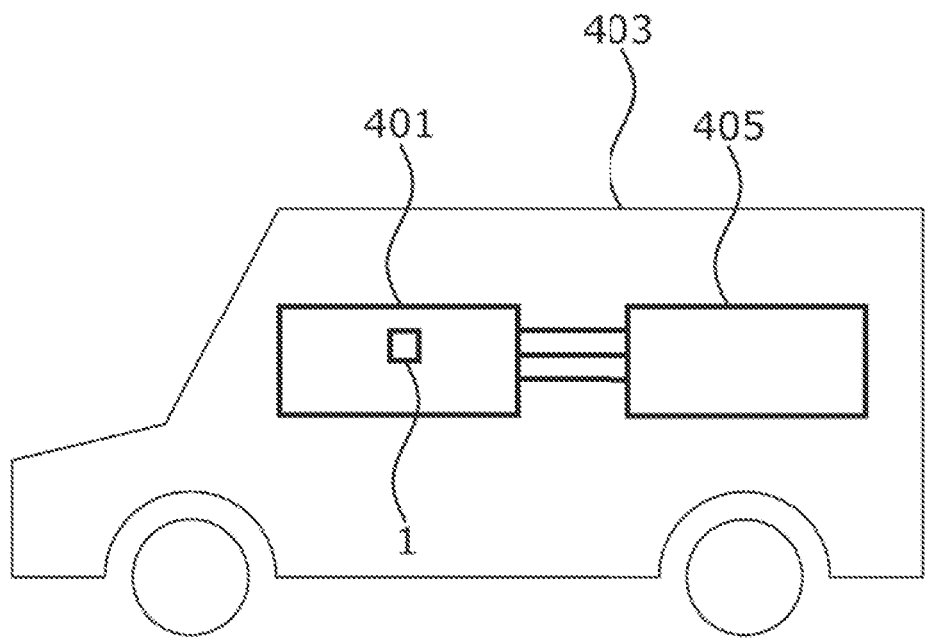
FIG. 17 shows a vehicle with an electric machine, in particular an electric motor with a stator.

FIG. 17 is a basic sketch of an exemplary embodiment of a vehicle 403, for example, a hybrid vehicle or an electric vehicle, comprising an electric machine 401, in particular an electric motor, with an exemplary embodiment of stator 1 for driving vehicle 403. Furthermore, vehicle 403 may have an inverter 405, which supplies electric machine 401 with an alternating current from a direct current source.

LIST OF REFERENCE NUMERALS

1 Stator
2, 3, 21-38b Pin 5, 51-58, 71-78 Slot
81-88, 91-96 Slot
7 First end face
9 Second end face
11 First distance
13 Second distance
15 Third distance
21 First end pin
28 Second end pin
21a Third end pin
28a Fourth end pin
21b Fifth end pin
28b Sixth end pin
31 Seventh end pin
38 Eighth end pin
31a Ninth end pin
38a Tenth end pin
31b Eleventh end pin
38b Twelfth end pin
41-48, 41a-48a, 41b-48b Winding
61 First connection type
62 Second connection type
63 Third connection type
64 Fourth connection type
65 Fifth connection type
66 Sixth connection type
67 Seventh connection type
68 Eighth connection type
101, 105, 111, 115, 121, 125 Input
103, 107, 113, 117, 123, 127 Output
201 First coil
202 Second coil
401 Electric machine
403 Vehicle
405 Inverter
L1, L2, L3, L4, L5, L6 Layer
M Stator center

The invention claimed is:

1. A stator for an electric machine comprising:
a plurality of pins, which are arranged on concentric circles at different distances to a stator center in slots in the stator, and each concentric circle forming a layer; the concentric circles forming different layers from outwards to inwards, the layers being numbered in an ascending order from an outside inward to the stator center; and
a winding,
wherein in each case six pins in the different layers are serially connected to one another and form the winding;
a first pin of the winding is located in a first slot in a 6n-1 layer, wherein n is an integer;
a second pin of the winding is located in a second slot in a 6n layer, wherein the second slot has a first radial distance to the first slot in a first circumferential direction of the stator;
a third pin of the winding is located in a third slot in a 6n-2 layer;
a fourth pin of the winding is located in a fourth slot in a 6n-3 layer;
a fifth pin is located in the first slot in a 6n-5 layer; and
a sixth pin of the winding is located in the second slot in a 6n-4 layer.

2. The stator according to claim 1, wherein the stator has at least two windings and at least the sixth pin in the second slot is connected to a seventh pin in the 6n-1 layer in a third slot by means of a sixth connection type.

3. The stator according to claim 2, wherein the stator has a plurality of windings, which extend across an entire circumference of the stator and thereby form a partial coil.

4. The stator according to claim 3, wherein three pins each from three partial coils are connected to one another by means of a seventh connection type or an eighth connection type and form a coil.

5. The stator according to claim 4, wherein the partial coils form six coils, and these are assigned to three phases in such a way that in each case, two coils, which are assigned to a same phase, are located in four adjacent slots.

6. The stator according to claim 4, wherein respectively one input inputs of end pins from at least two coils are connected to one another by means of a ninth connection type.

7. The stator according to claim 6, wherein outputs of end pins of the at least two coils are connected to one another, and the two coils are thus switched in parallel, and are assigned to one phase.

8. A vehicle with an electric machine with a stator according to claim 1.

9. The stator according to claim 1, wherein the third slot to the fourth slot has a first distance, which is equal to the first distance between the second slot and the first slot.

10. The stator according to claim 1, wherein the third slot lies adjacent to the first slot and on a same adjacent side in the circumferential direction as the fourth slot with respect to the second slot.

11. A stator for an electric machine comprising:
a plurality of pins, which are arranged on concentric circles at different distances to a stator center in slots in the stator, each concentric circle forming a layer;
wherein in each case, six pins in different layers are serially connected to one another and form a winding;
a first pin of the winding is located in a first slot in a 6n-1 layer, wherein n is an integer;
a second pin of the winding is located in a second slot in a 6n layer, wherein the second slot has a first radial distance to the first slot in a first circumferential direction of the stator;
a third pin of the winding is located in a third slot in a 6n-2 layer;
a fourth pin of the winding is located in a fourth slot in a 6n-3 layer;
a fifth pin is located in the first slot in a 6n-5 layer; and
a sixth pin of the winding is located in the second slot in a 6n-4 layer,
wherein the stator has a first end face and a second end face;
the first pin and the second pin are connected to one another on the second end face by means of a first connection type;
the second pin and the third pin are connected to one another on the first end face by means of a second connection type;
the third pin and the fourth pin are connected to one another on the second end face by means of a third connection type;
the fourth pin and the fifth pin are connected to one another on the first end face by means of a fourth connection type;
the fifth pin and the sixth pin are connected to one another on the second end face by means of a fifth connection type; and wherein the first, second, third, fourth, and fifth connection types differ from one another.

\* \* \* \* \*